(12) United States Patent
Kroupa (10) Patent No.: US 9,505,547 B2
(45) Date of Patent: *Nov. 29, 2016

(54) ATTACHABLE EXTENDABLE AND RETRACTABLE EARPIECE AND PROTECTIVE CASING ASSEMBLY FOR MOBILE COMMUNICATION AND SOUND DEVICES

(71) Applicant: Robert Kroupa, Chicago, IL (US)

(72) Inventor: Robert Kroupa, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/981,201

(22) Filed: Dec. 28, 2015

(65) Prior Publication Data

US 2016/0107825 A1 Apr. 21, 2016

Related U.S. Application Data

(63) Continuation of application No. 14/323,121, filed on Jul. 3, 2014, now Pat. No. 9,237,396, which is a continuation of application No. 12/708,695, filed on Feb. 19, 2010, now Pat. No. 8,783,531.

(51) Int. Cl.

| | |
|---|---|
| *B65H 75/40* | (2006.01) |
| *A45F 5/00* | (2006.01) |
| *B65D 85/04* | (2006.01) |
| *B65H 75/44* | (2006.01) |
| *H02G 11/02* | (2006.01) |
| *H04B 1/3888* | (2015.01) |
| *H04R 1/10* | (2006.01) |

(52) U.S. Cl.
CPC .............. *B65D 85/04* (2013.01); *A45F 5/004* (2013.01); *B65H 75/446* (2013.01); *B65H 75/4431* (2013.01); *H02G 11/02* (2013.01); *H04B 1/3888* (2013.01); *H04R 1/1033* (2013.01); *A45F 2200/0516* (2013.01); *B65H 2701/34* (2013.01)

(58) Field of Classification Search
CPC ... H04R 1/1033; H04B 1/3888; A45F 5/004; A45F 5/021
USPC ......... 224/162, 191, 930; 242/396; 206/320; 381/384
See application file for complete search history.

(56) References Cited

U.S. PATENT DOCUMENTS

| | | | |
|---|---|---|---|
| 5,044,981 | A | 9/1991 | Suffi et al. |
| 5,253,292 | A * | 10/1993 | Fluder .................... H04M 1/04 379/426 |
| 5,664,868 | A | 9/1997 | Montalbano et al. |
| 6,170,775 | B1 | 1/2001 | Kovacik et al. |
| 6,273,354 | B1 | 8/2001 | Kovacik et al. |
| 6,616,080 | B1 | 9/2003 | Edwards et al. |
| 6,633,770 | B1 | 10/2003 | Gitzinger et al. |
| 6,644,582 | B1 | 11/2003 | Liao |
| D484,874 | S | 1/2004 | Chang et al. |

(Continued)

FOREIGN PATENT DOCUMENTS

| | | |
|---|---|---|
| DE | 29918357 | 10/1999 |
| DE | 29918357 | 1/2000 |
| GB | 2316300 | 2/1998 |

*Primary Examiner* — Justin Larson
*Assistant Examiner* — Lester L Vanterpool
(74) *Attorney, Agent, or Firm* — Cook Alex Ltd.

(57) ABSTRACT

An extendable and retractable earpiece cable assembly for mobile communication or sound devices including a housing integrally formed with or detachably connected to a casing for protecting a mobile electronic device. The housing receives a mechanism around which at least one earpiece cable is removably wound. The earpiece cable is extendable from and retractable into the housing.

19 Claims, 3 Drawing Sheets

(56) References Cited

U.S. PATENT DOCUMENTS

| | | | |
|---|---|---|---|
| 6,701,159 B1 | 3/2004 | Powell | |
| 6,712,304 B1 | 3/2004 | Taylor | |
| 6,731,956 B2 | 5/2004 | Hanna et al. | |
| 6,763,111 B2 * | 7/2004 | Liao | H04M 1/15 379/430 |
| 7,032,728 B2 | 4/2006 | Harcourt | |
| 7,151,912 B1 | 12/2006 | Morrison | |
| 7,257,422 B2 * | 8/2007 | Loprete | H04M 1/05 379/420.04 |
| 7,286,789 B2 | 10/2007 | Umezawa | |
| D565,291 S | 4/2008 | Brandenburg et al. | |
| D574,819 S | 8/2008 | Andre et al. | |
| D575,056 S | 8/2008 | Tan | |
| D581,151 S | 11/2008 | Aipa | |
| 7,478,776 B2 | 1/2009 | Salentine et al. | |
| D587,896 S | 3/2009 | Aipa | |
| 7,539,302 B2 | 5/2009 | Kulas | |
| 7,612,997 B1 * | 11/2009 | Diebel | G06F 1/1632 361/679.41 |
| D606,751 S * | 12/2009 | Andre | D3/269 |
| 7,648,027 B2 | 1/2010 | Lin et al. | |
| 7,699,198 B2 | 4/2010 | Sirichai et al. | |
| D621,822 S | 8/2010 | Richardson et al. | |
| D622,716 S * | 8/2010 | Andre | D14/250 |
| 7,782,610 B2 | 8/2010 | Diebel et al. | |
| D624,910 S | 10/2010 | Richardson et al. | |
| 7,933,122 B2 | 4/2011 | Richardson et al. | |
| D644,636 S | 9/2011 | Richardson et al. | |
| D645,031 S | 9/2011 | Richardson et al. | |
| 8,016,107 B2 | 9/2011 | Emsky | |
| 8,204,561 B2 | 6/2012 | Mongan et al. | |
| 8,245,842 B2 | 8/2012 | Bau | |
| D667,823 S | 9/2012 | Merenda | |
| 8,284,980 B2 | 10/2012 | Parker et al. | |
| 8,367,235 B2 | 2/2013 | Huang | |
| 8,439,191 B1 | 5/2013 | Lu | |
| 8,457,701 B2 | 6/2013 | Diebel | |
| 8,485,404 B2 | 7/2013 | Monaco et al. | |
| 8,579,172 B2 * | 11/2013 | Monaco | H04M 1/15 224/191 |
| 2001/0035242 A1 | 11/2001 | Hughs et al. | |
| 2002/0126837 A1 | 9/2002 | Dowsett et al. | |
| 2002/0193151 A1 | 12/2002 | Edreich | |
| 2003/0060241 A1 * | 3/2003 | Loprete | H04M 1/05 455/569.1 |
| 2003/0157973 A1 | 8/2003 | Yang | |
| 2003/0165237 A1 | 9/2003 | Farr et al. | |
| 2004/0077382 A1 * | 4/2004 | Verity | H04B 1/3838 455/569.1 |
| 2004/0203521 A1 | 10/2004 | Nassimi | |
| 2004/0204165 A1 | 10/2004 | Huang | |
| 2004/0256188 A1 * | 12/2004 | Harcourt | B65H 75/4428 191/12.2 A |
| 2005/0116684 A1 | 6/2005 | Kim | |
| 2005/0255898 A1 * | 11/2005 | Huang | H04B 1/3877 455/575.8 |
| 2006/0058081 A1 * | 3/2006 | Reichenbach | B60R 11/0241 455/575.8 |
| 2006/0287006 A1 * | 12/2006 | McIntyre | H04M 1/15 455/569.1 |
| 2007/0165371 A1 | 7/2007 | Brandenburg | |
| 2007/0293288 A1 | 12/2007 | Lin et al. | |
| 2008/0009329 A1 | 1/2008 | Adler | |
| 2008/0053852 A1 | 3/2008 | Ko et al. | |
| 2008/0080732 A1 * | 4/2008 | Sneed | H04R 1/1033 381/374 |
| 2008/0232089 A1 | 9/2008 | Riccardi | |
| 2009/0186264 A1 | 7/2009 | Huang | |
| 2010/0200456 A1 | 8/2010 | Parkinson | |
| 2011/0130174 A1 * | 6/2011 | Kroupa | H04M 1/05 455/569.1 |
| 2011/0203954 A1 | 8/2011 | Kroupa | |
| 2011/0233078 A1 | 9/2011 | Monaco et al. | |
| 2012/0153065 A1 | 6/2012 | Fischer | |
| 2012/0314351 A1 | 12/2012 | Kroupa | |
| 2013/0029725 A1 | 1/2013 | Heil-Brice et al. | |
| 2013/0083456 A1 | 4/2013 | Koenig et al. | |
| 2013/0188820 A1 | 7/2013 | McLaughlin | |
| 2013/0208937 A1 | 8/2013 | Stern et al. | |
| 2013/0237290 A1 | 9/2013 | Simmons et al. | |

* cited by examiner

ATTACHABLE EXTENDABLE AND RETRACTABLE EARPIECE AND PROTECTIVE CASING ASSEMBLY FOR MOBILE COMMUNICATION AND SOUND DEVICES

CROSS-REFERENCE TO RELATED APPLICATIONS

This is application is a continuation of co-pending U.S. patent application Ser. No. 14/323,121, filed Jul. 3, 2014, which further claims priority to and is a continuation of U.S. patent application Ser. No. 12/708,695, filed Feb. 19, 2010, which issued as U.S. Pat. No. 8,783,531 on Jul. 22, 2014, wherein the entire disclosure of these related applications are hereby incorporated by reference in their entirety.

BACKGROUND OF THE INVENTION

1. Field of the Invention

The present invention relates generally to extendable and retractable earpieces for mobile sound and communication devices, and more particularly to a combination extendable and retractable earpiece assembly integrally formed with or removably attached to a protective casing adapted to protect a mobile electronic device.

2. Description of the State of the Art

Portable sound and communication devices deliver sound waves through either a built in speaker unit or a pair of earpieces adapted to be electrically connected to and removed from the device. While a speaker is a practical feature for a portable communication device, portable sound systems designed to deliver a user's musical selections or other multimedia choices over a period of time generally require connection of at least one headset earpiece, or earpieces per se, to the portable device to convey the sound to the user in private, and without disturbing those nearby the user. Also, many portable communication devices that have a built-in speaker system also have a socket for receiving an earpiece connection plug.

Currently, most if not all portable sound devices, and many portable communication devices, are used with headsets or earpieces. For example, portable communication device users rely on headsets or earpieces for convenience in multi-tasking. Such headsets and earpieces, and associated wires, however, when not in use, extend and dangle from the mobile device, allowing the wires, headset and/or earpieces to become ensnared on a nearby object, such as the user's clothing, and to rip out of the device causing damage to the headset or earpieces and wires, or both. Replacement of such damaged parts can be costly.

Additionally, most users of portable sound and communication devices are required to carry at least three separate pieces: a carrying case, a headset or earpieces, and the sound or communication device. Locating and carrying three separate pieces is often frustrating and time consuming. Additionally, certain scientific studies have suggested that the extended use of cell phone or blue tooth wireless headset devices, when the cell phone or blue tooth wireless headset device is placed directly adjacent to one's ear can result in undesirable health problems, such as tumors and cancer, not the least of which is known as cell phone elbow with cell phones. Some users of blue tooth wireless headset devices or cell phones in close proximity to the ear have also reported increased headaches.

A common accessory furnished with mobile communication and sound devices is a pliable plastic or rubber casing that extends tightly around the outer body of the device, with apertures in the casing allowing the user to access the controls, inputs, outputs, and displays of the communication or sound device. The plastic or rubber tightly fitting casing protects the integrity of the mobile device if the device is accidentally dropped or flung into contact with a hard surface by absorbing potentially disabling shock forces before they reach the mobile device.

Presently available recharging units and carrying cases for portable sound and communication devices include assemblies to hold earpiece cables around a spool attached to the carrying case or recharging unit. See, for example, U.S. Patent Publications No. 2005/0116684; 2005/0255898; and 2007/0293288. The prior art also includes stand alone headset cable reel assemblies that attach to the cable itself. These devices add yet another separate component for a user of a portable sound or communication device to deal with. For example, see Patent Publication No. 2001/0035242. Furthermore, presently available casings are used to protect mobile electronic devices from contact with external elements to prevent scratches, dents, and even protect from contact with water. See, for example, U.S. Patent Publications No. 2005/0140255 A1; 2008/0039161 A1; and U.S. Pat. No. 6,078,792.

While minimizing the amount of accessories needed for a mobile electronic device, the present device also minimizes the length of a connector plug cable and earpiece cables exposed to the environment during use reducing potential damage to the mobile electronic device as well as injury to the user. This is particularly advantageous for children carrying backpacks and sports duffle bags who desire to listen to music or speak with their friends on the phone at the same time. This is also advantageous to adults hurrying to appointments while carrying a brief case or purse while speaking on the phone.

None of the aforesaid prior devices provide a combined integral extendable and retractable earpiece cable reel assembly that is integrally formed with or removably attached to a tight fitting protective casing for a portable sound or communication device.

SUMMARY OF THE INVENTION

The present invention provides, in one embodiment, a carrying clip allowing a user to attach a mobile sound or communication device such as a cell phone, sound pod, PDA, pager, etc, to the user's belt, pocket, handbag, backpack or other personally worn or carried item. The carrying clip fixedly or pivotally attaches to a casing, which tightly encases the mobile electronic device. The casing made of rubber, plastic, or other suitable materials is configured so that the interior of the casing has substantially the same dimensions as the exterior of the electronic mobile device. The casing includes apertures for the controls and input and output ports of the mobile electronic device as well as an aperture for each electronic display. The casing, in one embodiment, also includes an integrally formed reel housing portion in which the extendable and retractable earpiece cables are located. In a further embodiment, the earpiece cable reel housing is removably attached to the casing. Each earpiece is attached to an earpiece cable that is electrically connected to the earpiece at one end, and to a connector plug at an opposite end. The earpiece cables and connector plug cables penetrate the reel housing through earpiece cable apertures and connector plug apertures, respectively. The connector plug is designed to be inserted into the outlet portal of the mobile electronic device. The housing in the further embodiment can be removed for service or replacement, and reattached again to the casing's posterior side, opposite the casing aperture for the electronic display. The reel housing portion in another embodiment is integrally formed with the casing on the casing's posterior side, opposite the casing aperture for the electronic display. These embodiments of the invention eliminate carrying three separate items: the cell phone or sound pod, carrying case, and headset or earpieces.

BRIEF DESCRIPTION OF THE DRAWINGS

The following figures are included to better illustrate the embodiments of the devices and techniques of the present invention. In these figures, like numerals represent like features in the several views. It is to be noted that these figures, illustrating the several views of the present invention, unless stated to be otherwise, are not necessarily drawn to scale. Nor are the contents of the drawings to be considered as limiting the scope of the present invention as defined in the claims.

DETAILED DESCRIPTION OF THE ILLUSTRATED EMBODIMENTS

The present invention provides a retractable earpiece cable or headset assembly in a reel housing, where the reel housing is mounted on a casing. In one embodiment, the reel housing is integrally formed with the casing. In a further embodiment, the reel housing is mounted to the casing using an attachable and detachable mounting assembly. The casing is adapted to tightly encase a mobile communications or sound device for protection of the device against shock forces, and the cable assembly is extendable from and retractable into a reel housing integrally formed with the casing. A clip assembly is also mounted on the casing for attaching the casing and mobile electronic device to a belt, pocket, backpack or strap worn or supported by the user. The invention allows a user to carry only a single item that includes the mobile communication or sound device, retractable headset or earpiece and cables, and the casing firmly attached to the mobile device, in lieu of transporting several pieces to achieve the same results provided by the present invention. The user benefits from the convenience and ease of transporting and using his or her mobile communication or sound device, and having a clip-on unit and cable reel assembly integrally formed with or detachably mounted on the protective casing extending over portions of the mobile electronic device to prevent the cables from becoming tangled or hanging loose when the sound capabilities of the portable device are not being used.

Figure 1:
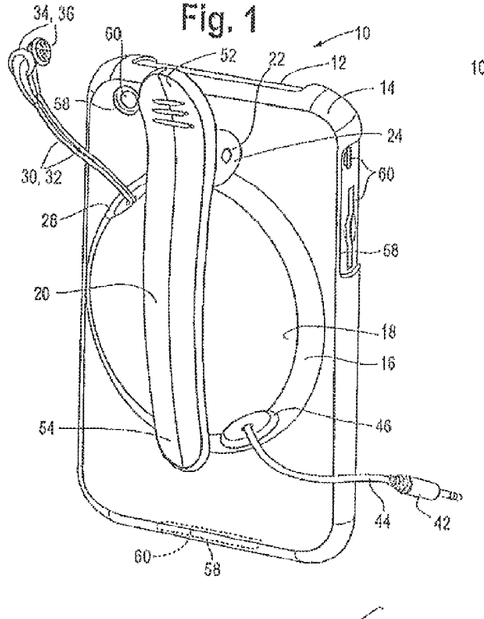
FIG. 1 is a rear perspective view of an embodiment of the retractable earpiece and casing assembly of the present invention, wherein the carrying clip is attached the casing, the extendable and retractable earpiece cable assembly is located inside the reel housing, and the reel housing is integrally formed with the casing. The casing is adapted to encase and protect the mobile communication or sound device.
Figure 2:
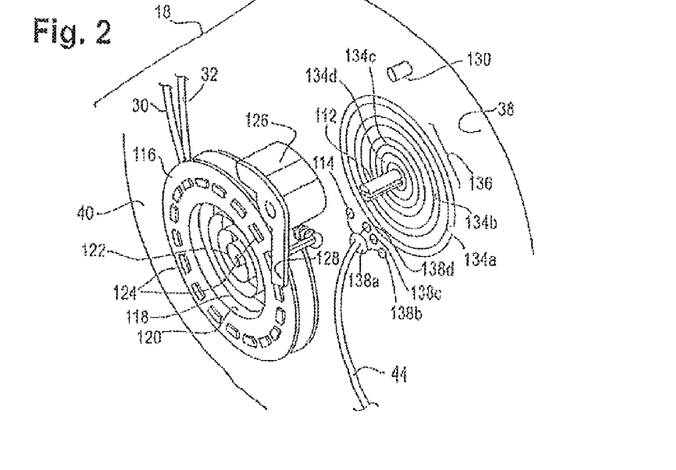
FIG. 2 is an exploded view of the cable reel mechanism lodged in the integral reel housing of FIG. 1, illustrating a typical extendable and retractable cable reel in the housing.

Referring to the embodiment of FIGS. 1-5 and 7, the protective apparatus 10 is adapted to protect a mobile electronic device 12, and casing 14, having an integral, hollow reel housing 16, is adapted to fit tightly over portions of the mobile device 12. The reel housing 16 houses the extendable and retractable earpiece cable assembly 18 of the present invention (FIG. 2). As seen in FIG. 1, the reel housing 16 of this embodiment is integrally formed with the casing 14 of the protective apparatus 10.

Figure 7:
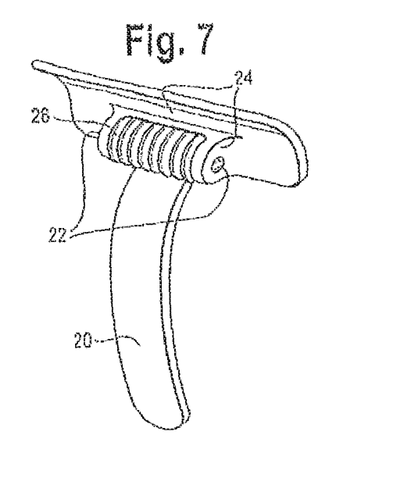
FIG. 7 is a perspective view of an embodiment of a carrying clip assembly, wherein the carrying clip is pivotally attached to the casing by pivot pins and brackets. The carrying clip rests in the closed position, abutting the casing, due to the force exerted on the carrying clip by the spring.

A carrying clip 20 is pivotally attached to the casing 14 by pivot pins 22 (FIG. 7) extending through a pair of brackets 24. Brackets 24 are each attached to or integral with the casing 14 of protective apparatus 10. Carrying clip 20 is biased to the closed position against the casing 14 by means of a coil spring assembly 26 (FIG. 7). As will be explained, carrying clip 20 is adapted to removably engage a belt, strap or other item worn by a user of mobile electronic device 12.

The hollow reel housing 16 is integrally formed with the casing 14 of the protective apparatus 10. A retractable and extendable earpiece cable reel assembly 18 (FIG. 2) is located inside reel housing 16. As seen in FIG. 1, reel housing 16 includes at least one earpiece cable aperture 28 through which earpiece cables 30 and 32 extend. Each earpiece cable 30, 32 is electrically connected to an earpiece 34, 36. Earpiece cables 30, 32 are attached at their respective ends opposite earpieces 34, 36 to a retractable and extendable reel mechanism inside reel housing 16, that allows earpiece cables 30, 32 to be manually extended from reel housing 16 as the user places earpieces 34, 36 in his or her ears.

Referring to FIGS. 1 and 2, reel housing 16 includes a shaft 112 attached to and extending from the anterior wall 38 of the reel housing 16, and the shaft 112 extends toward the flexible posterior wall 40 of the reel housing 16. A slit 114 is formed in the upper portion of shaft 112. A cable reel 116 is located in reel housing 16, and a coil plate spring 118 is located in an open circular wall portion 120 of cable reel 116. When cable reel 116 is assembled in reel housing 16, an end 122 of spring 118 fits into slit 114 of shaft 112, holding one end of spring 118 against rotation. The other end of spring 118 is firmly attached to wall portion 120 of cable reel 116.

Reel 116 includes a plurality of angled ratchet teeth 124 mounted on a rim of the reel 116. A release actuator comprising a button 126, a stopper and release assembly including an arm 128, and the release button 126 is pivotally mounted to a shaft 130 attached to the anterior wall 38 of the reel housing 16. The underside of the outer end of stopper and release arm 128 includes a stop member (not shown) that is adapted to engage ratchet teeth 124 and allow rotation of cable reel 116 in the clockwise direction. When release button 126 is pivoted, and arm 128 is moved away from engagement with ratchet teeth 124, spring 118 will rotate reel 116 in a counter-clockwise direction, as will be explained. A small spring 132 engages a sidewall of reel housing 16, and biases stopper and release arm 128 into engagement with ratchet teeth 124.

In the embodiment illustrated in FIG. 2, a plurality of concentric conductive rings 134a, b, c, d are located on the anterior wall 38 of the reel housing 16. A printed circuit board 136 is positioned on the anterior wall 38 inside the reel housing 16, and includes a plurality of concentric conductive rings 134a-d. Each of the conductive rings 134a-d are electrically connected to cable 36 and connector plug 42 (FIG. 1) by solder points 138a-d (FIG. 2). In the illustrated embodiment, four spring wiper contacts (not shown) are attached to cable reel 116 and are aligned such that when cable reel 116 rotates, the spring wiper contacts remain in constant contact with a corresponding conductive ring 134a-d. The four wires in both earpiece cables 30, 32, are each connected to one of the spring wiper contacts on cable reel 116. Release button 126 rests against the flexible posterior wall 40 inside reel housing 16, allowing the user to press the outside of the flexible posterior wall 40 of reel housing 16 making release button 126 accessible to a user.

When a user desires to extract earpiece cables 30, 32 from reel housing 16, the user pulls outward on earpieces cables 30, 32 (FIG. 1) using a slight tension force. The stop member (not shown) on the underside of stopper and release arm 128 glides over ratchet teeth 124 as reel 116 rotates without engaging the ratchet teeth 124. Simultaneously, spring 118 is wound, thus storing kinetic energy. When a sufficient length of earpiece cable 30, 32 has been extracted from reel housing 16, tension on the cables is released, and the stop member engages one of the ratchet teeth 124, preventing reverse rotation of cable reel 116. Reel 116 can be fixed at any point on the rotation of reel 116, allowing the user to extract any suitable length of earpiece cable 30, 32 and have the earpiece cable 30, 32 fixed at that extracted length until release button 126 is pushed inward.

When the user desires to retract earpiece cables 30, 32 into reel housing 16, finger pressure is applied to the outside of the posterior wall 40 of the reel housing 16 adjacent the release button 126 located inside the reel housing 16. The pressure applied to the release button 126 pivots the stopper and release arm 128 out of engagement with the ratchet teeth 124. The kinetic energy stored in spring 118 is released, rotating reel 116 in an opposite direction, thus rewinding earpiece cables 30, 32 onto reel 116. At all times during the extraction or retraction of earpiece cables 30, 32 relative to reel housing 16, the earpieces 34, 36 remain electrically connected to solder points 138a-d and to connector plug 42 (FIG. 1). Earpiece cables 30, 32 are prevented from being retracted fully inside of reel housing 16 since the outer diameters of earpieces 34, 36 at the point where they attach to earpiece cables 30, 32, respectively, are larger than the inner diameters of earpiece cable aperture 28.

The concentric ring-spring wiper contact, spring operated reel and lock-release designs illustrated in FIG. 2 and described above are well known in the field of electrical and mechanical design. However, the described retractable earpiece cable structure has not been used previously in a retractable and extendable earpiece cable assembly whose reel housing is integrally formed into a protective casing for a mobile communication or sound device.

The ends of earpiece cables 30, 32 opposite earpieces 34, 36 as described above, are electrically connected through solder points 138a-d to a connector plug cable 44 extending from a connector plug aperture 46 (FIG. 1) in reel housing 16. The terminus end of connector plug cable 44 (FIG. 2) includes a connector plug 42 (FIG. 1) that is adapted to be inserted through the sound output portal aperture 48 (FIGS. 3, 4, 5) of the casing 14 and into the sound output portal 50 of the mobile electronic device 12. For convenience, the connector plug cable 44 may be a self-coiling cable that is extended when connector plug 42 is inserted into sound output portal 50.

To operate the extendable and retractable earpiece cable assembly 18 illustrated in FIGS. 1 and 2, a user must insert the mobile electronic device 12 into the casing 14 of the protective apparatus 10. The user then attaches carrying clip 20 to his or her belt, strap, backpack, item of clothing, etc., by pressing on upper portion of carrying clip 52 (FIG. 1) and moving the bottom portion of carrying clip 54 away from the casing 14 and reel housing 16. When suitably attached to the apparel or accessory item worn by the user, upper portion of the carrying clip 52 is released, and carrying clip 20 holds the casing 14 and mobile electronic device 12 securely to the user's apparel or accessory item. If necessary or desired, the mobile electronic device 12 is activated to be able to receive and/or send electronic impulses that are transformed into sound at earpieces 34, 36.

The user then manually grasps earpieces 34, 36 and applies a tension or pulling force that extracts cables 30, 32 out of reel housing 16 through the earpiece cable apertures 28. As earpiece cables 30, 32 are extracted from reel housing 16, the spring 118 (FIG. 2) acting on the cable reel 116 inside reel housing 16 is wound, applying a tension force on the ends of earpiece cables 30, 32 extending around the cable reel 116. Upon extracting a sufficient length of earpiece cable 30, 32 from reel housing 16 to allow the user to insert one earpiece 34, 36 in each ear, the retraction process is halted, and the automatic reel brake mechanism shown in FIG. 2, is activated to brake the earpiece cables 30, 32 against being retracted back into reel housing 16 until the user has completed using mobile electronic device 12. Before the user can begin use of the mobile electronic device 12, the user must also manually grasp the connector plug cable 44 and gather enough slack to insert the connector plug 42 through the sound output portal aperture 48 and into the sound output portal 50.

The length of the connector plug cable 44 is determined by the relative position of the connector plug aperture 46 to the sound output portal aperture 48 and sound output portal 50, having enough connector plug cable 44 to reach the sound output portal 50 and plug the connector plug 42 into the sound output portal 50. However, the connector plug cable 44 should also be short enough to minimize potential snagging of the connector plug cable 44 on external objects during use. Once the connector plug 42 is inserted into the sound output portal 50, the mobile electronic device 12 can transmit an audio signal through the connector plug cable 44 and the earpiece cables 30, 32 into the earpiece 34, 36 and to the user.

To retract the earpiece cables 30, 32 back into reel housing 16, the user removes the earpieces 34, 36 from the ears, and applies a brief tug or tension force on the earpiece cables 30, 32. The spring operated cable reel 116 inside housing 16 is released as explained above, and the energy stored in the reel spring 118 when the earpiece cables 30, 32 were extracted from reel housing 16 rotates the cable reel 116 and draws earpiece cables 30, 32 back onto cable reel 116 and into reel housing 16 until each earpiece 34, 36 abuts reel housing 16 adjacent an earpiece cable aperture 28. It is not necessary to disengage connector plug 42 from sound output portal 50 when the mobile electronic device 12 is no longer being used.

Thus, as seen in FIGS. 1 and 2, an extendable and retractable earpiece cable assembly 18 and an integral reel housing 16 is provided in a single unit integrally formed in the casing 14 encasing the mobile electronic device 12. The user need not carry separate headphones or earpieces and separate attachment devices or pouches when transporting and/or using their mobile sound or communication device. The invention described above and shown in FIGS. 1 and 2 provides the user of the mobile electronic device 12 with the convenience of having the earpieces and attachment apparatus for their mobile device as a single unit, thus providing ease of use and aiding in preventing the loss of individual components.

Figure 3:
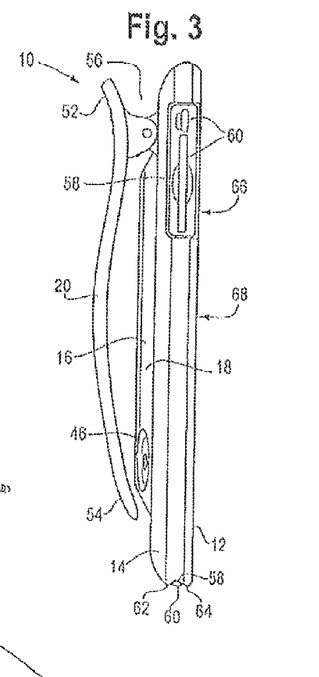
FIG. 3 is a side view depicting the reel housing and carrying clip, connector plug aperture, and mobile device control apertures of the earpiece and casing assembly shown in FIG. 1.
Figure 5:
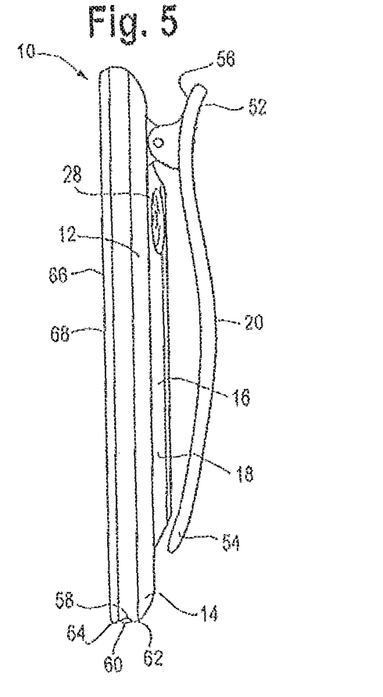
FIG. 5 is a side view, opposite of FIG. 3, depicting the reel housing and carrying clip as well as the earpiece cable apertures of the earpiece and casing assembly shown in FIG. 1.

FIGS. 3 and 5 are side views of the protective apparatus 10 of FIG. 1 showing the extendable and retractable earpiece cable assembly 18 inside the reel housing 16 which is integrally formed with the casing 14 and carrying clip assembly 56. These figures depict input port apertures 58 to allow access through the casing 14 to input ports 60. Additionally, output port apertures 62 allow access through the casing 14 to output ports 64. The input port apertures 58 and output port apertures 62 can be placed in any position on the casing 14 to allow access to input ports 60 and output ports 64. Furthermore, the input port apertures 58 and output port apertures 62 can openly expose the input ports 60 and output ports 64 to the environment outside the casing 14 or the input port apertures 58 and output port apertures 62 can have a flexible removable membrane, for example, rubber or plastic, covering the input ports 60 and output ports 64 protecting the input ports 60 and output ports 64 from the environment.

Figure 4:
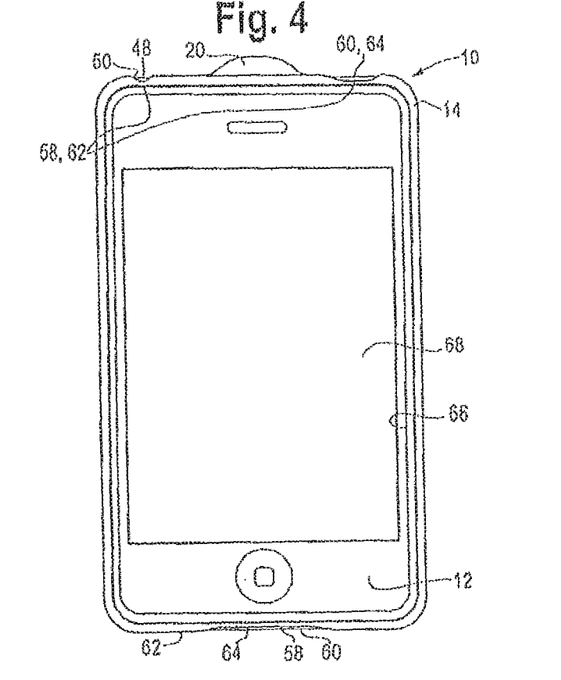
FIG. 4 is a front view of an embodiment of the invention depicting the electronic display aperture in the casing assembly.

FIG. 4 is a front view of the protective apparatus 10 showing the electronic display aperture 66 allowing access to the electronic display 68 and the sound output portal aperture 48 (FIG. 4) of the mobile electronic device 12, allowing access to the sound output portal 50. The electronic display aperture 66 can openly expose the electronic display 68 to the environment, or the electronic display aperture 66 can transparently cover the electronic display 68 protecting the electronic display from the environment, while still allowing the user to interface with the electronic display 68.

Figure 6:
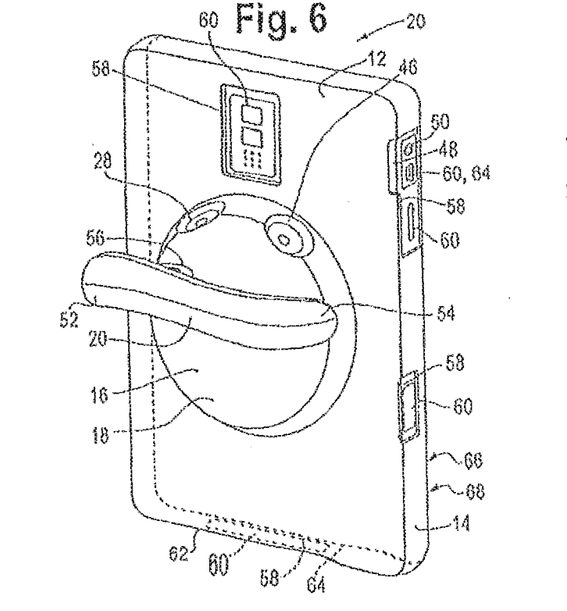
FIG. 6 is a perspective view of another embodiment of the invention wherein the carrying clip is attached to, and the extendable and retractable earpiece cable assembly reel housing is integrally formed with, a side of the casing. The casing is adapted to encase the mobile communication or sound device.

FIG. 6 is another embodiment of the invention illustrated in FIGS. 1-5 and 7, wherein the carrying clip 20 is mounted on the casing 14 from the left side of the casing 14 to the right side of the casing 14, instead of from the top of the casing 14 to the bottom of the casing 14. FIG. 6 illustrates that the position of the carrying clip can be altered to accommodate the position of input port apertures 58 and output port aperture 62, input ports 60 and output ports 64 which in this embodiment are located in the top middle portion of the casing 14. In another embodiment of the invention illustrated in FIGS. 1-5 and 7 the carrying clip 20 can be mounted in any position to accommodate the needs of the manufacturer or user.

Figure 8:
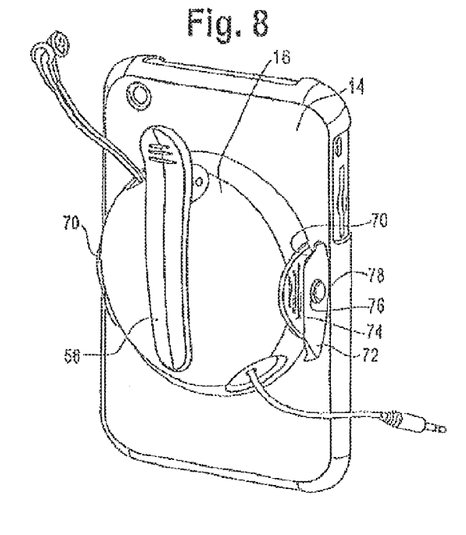
FIG. 8 is a rear perspective view of a further embodiment of the retractable earpiece and casing assembly of the present invention, wherein the carrying clip is attached to the reel housing, the extendable and retractable earpiece cable assembly is located inside the reel housing, and the reel housing is removably attached to the casing. The casing is adapted to encase the mobile communication or sound device.

In a further embodiment of the invention, as shown in FIGS. 8-11, the reel housing 16 is removably attached to the casing 14. As seen in FIG. 8, a reel housing attachment assembly 70 allows the reel housing 16 to be manually disengaged from the casing 14, and reengaged again with the casing 14. The reel housing attachment assembly 70 allows disengagement and reengagement of the reel housing 16 with the casing 14 to be repeated multiple times. The reel housing attachment assembly 70 comprises at least one reel housing attachment assembly female bracket 72 attached to the casing and at least one reel housing male attachment pin assembly 74 on opposed sides of reel housing 16 in the illustrated embodiment. This embodiment of the invention has the same amount of reel housing attachment assembly female brackets 72 as reel housing male attachment pin assemblies 74. In the illustrated embodiment, two brackets 72 and pin assemblies 74 are shown, however it is contemplated that the removable connection between reel housing 16 and casing 14 may comprise a single male-female attachment assembly, or more than two attachment assemblies.

Figure 9:
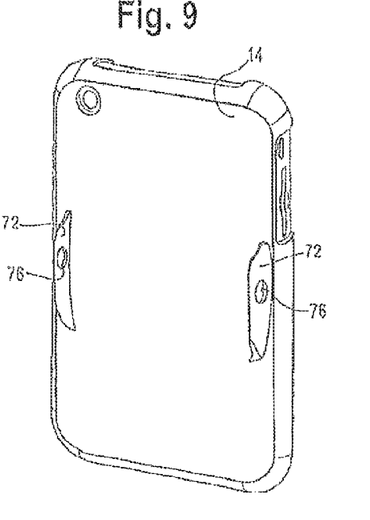
FIG. 9 is a rear perspective view of the embodiment of the protective apparatus of FIG. 8, wherein the reel housing (not shown) is removed from a pair of brackets attached to the casing.
Figure 10:
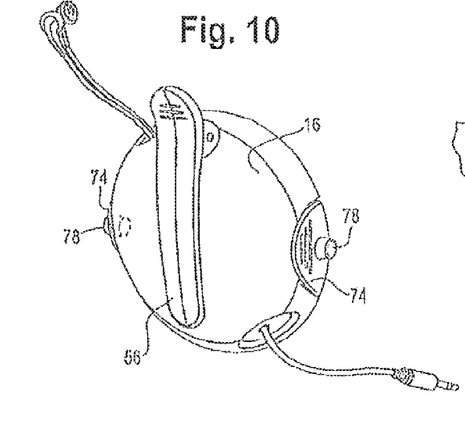
FIG. 10 is a perspective view of the detachable reel housing of the embodiment of FIG. 8, where the detachable reel housing is removed from the casing.

Each reel housing attachment assembly female bracket 72 is integrally formed with or attached to the casing 14 (FIG. 11) and each bracket is configured and spaced from an opposing bracket 72 (FIG. 9) so that reel housing 16 can be inserted between female brackets 72 thus removably securing reel housing 16 to the casing 14 (FIG. 9). Each bracket 72 includes at least one aperture 76 that is adapted to receive a spring-loaded male pin 78 extending from male attachment assembly 74 of reel housing 16. Each pin 78 is configured to fit snugly inside the corresponding aperture 76 (FIGS. 9 and 11) of female brackets 72. Each aperture 76 allows the corresponding spring-loaded male pin 78 to removably secure the reel housing 16 to the casing 14 after pins 78 are inserted through the corresponding female pin apertures 76 (FIG. 11).

Figure 11:
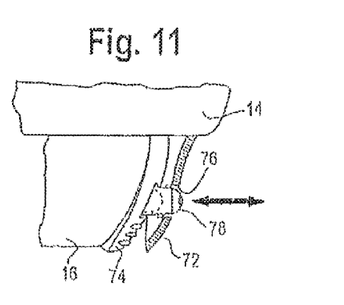
FIG. 11 is perspective detail view of the detachable reel housing of FIG. 8 attaching and detaching from the casing.

Male attachment pin assemblies 74 are integrally formed as part of the reel housing 16 (FIG. 11). The pin assemblies 74 are spaced so that each pin assembly 74 is aligned with a corresponding aperture 76 of a bracket 72. Each spring-loaded male pin 78 rests in the extended position in a direction away from the center of the reel housing 16. The spring-loaded pins 78 are configured so that the tip of each pin 78 is rounded, allowing for easier insertion and removal from the apertures 76. The pin assemblies 74 are sized so that reel housing 16 removably attaches securely to the casing 14.

To securely attach the reel housing 16 to the casing 14, a user must push in toward the center of the reel housing 16 on each pin 78 of each assembly 74 so that the reel housing 16 can be inserted between the brackets 72. The reel housing 16 is not capable of fitting between the brackets 72 unless all of the spring-loaded pins 78 are pushed in toward the center of the reel housing 16. Once the spring-loaded pins 78 are pushed in toward the center of reel housing 16, the user places the reel housing 16 between the brackets 72 and against the casing 14 in a position whereby each spring-loaded pin 78 is aligned with a corresponding aperture 76. Once each spring-loaded pin 78 is in position aligned with a corresponding aperture 76, pin assemblies 74 will hold the pins 78 in the pushed-in or non-resting position toward the center of the reel housing 16. The user then slides the reel housing 16 into position between brackets 72 so that the spring-loaded pins 78 move back to their resting positions and extend through the corresponding apertures 76, securing the reel housing 16 against the casing 14 and between the brackets 72.

To remove the reel housing 16 from the casing 14, the user manually pushes inward on each spring-loaded male pin 78 protruding through and resting in the female apertures 76 so that the spring-loaded male pins 78 are no longer protruding in a perpendicular manner, relative to the brackets 72, through the apertures 76. The user simultaneously moves the reel housing 16 until each spring-loaded pin 78 is held in the non-resting position, pushed toward the center of the reel housing 16 by the brackets 72. Once the brackets 72 are pushing in on the tips of pins 78, the user can release manual pressure on pins 78 and remove the reel housing 16 from the casing 14.

In the embodiment of the invention shown in FIGS. 8-11, the carrying clip assembly 56 is mounted on the reel housing 16, so that when the reel housing 16 is removed from the casing 14, the carrying clip assembly 56 remains attached to the reel housing 16.

In another embodiment (not shown), the carrying clip assembly 56 is mounted directly to the casing 14. The reel housing mounting brackets 72 and each pin assembly 74 are configured on the casing 14 so that use of the carrying clip assembly 56 is not impeded regardless of whether the reel housing 16 is engaged with the casing 14. Furthermore, the carrying clip assembly 56 can be of a different design configured to avoid an impediment created by the brackets 72 when the reel housing 16 is disengaged from the casing 14, or with the reel housing 16 when the reel housing is engaged with the casing 14.

The foregoing description of the illustrated embodiments of the invention has been presented for purposes of illustration and description, and is not intended to be exhaustive or to limit the invention to the precise forms disclosed. The description was selected to best explain the principles of the invention and practical application of these principles to enable others skilled in the art to best utilize the invention in various embodiments and various modifications as are suited to the particular use contemplated. It is intended that the scope of the invention not be limited by the specification, but be defined by the claims set forth below.

I claim:

1. A protective apparatus for a mobile electronic device, the mobile electronic device having input and output ports and at least one electronic screen display, the protective apparatus comprising:
    a casing having internal dimensions adapted to tightly and removably attach around all peripheral sides of the mobile electronic device while also extending around an aperture that permits access to the at least one electronic screen display when the protective apparatus is assembled to the mobile electronic device;
    an extendable and retractable earpiece cable assembly including at least one earpiece cable and a mechanism around which the at least one earpiece cable is wound;
    a housing having an interior that receives the mechanism around which the at least one earpiece cable is wound, wherein the housing is defined by a sidewall extending along at least a generally planar portion of a posterior wall of the casing, the housing sidewall having an opening through which the at least one earpiece cable is extendable and retractable, and wherein the interior of the housing faces toward and is disposed rearward of a rear surface of the mobile electronic device when the protective apparatus is assembled to the mobile electronic device;
    the at least one earpiece cable having a first end attached to an earpiece and a second end electrically connected to a connector plug that is electrically connected to an output port of the mobile electronic device when the protective apparatus is assembled to the mobile electronic device; and
    the casing, the housing, and the extendable and retractable earpiece cable assembly forming an integrated assembly to be used and stored by a user when the protective apparatus is assembled to the mobile electronic device.

2. The protective apparatus of claim 1, wherein the housing sidewall is integrally formed with a wall of the casing.

3. The protective apparatus of claim 1, wherein the housing is removably attached to the casing.

4. The protective apparatus of claim 1, wherein the casing further comprises a pliable material.

5. The protective apparatus of claim 1, wherein the casing further comprises a rubber or plastic material.

6. The protective apparatus of claim 1, wherein the extendable and retractable earpiece cable assembly further comprises a stopper and release assembly that alternately prevents rewinding of the at least one earpiece cable.

7. The protective apparatus of claim 1, wherein the extendable and retractable earpiece cable assembly releasably maintains the at least one earpiece cable in an extended position relative to the housing.

8. The protective apparatus of claim 1, further comprising a release actuator that when engaged allows retraction of the at least one earpiece cable.

9. The protective apparatus of claim 1, wherein the extendable and retractable earpiece cable assembly includes two earpiece cables.

10. The protective apparatus of claim 1, wherein the sidewall of the housing has a generally annular shape.

11. The protective apparatus of claim 1, wherein the casing has at least one opening that permits access to an output port of the mobile electronic device with the protective apparatus is assembled to the mobile electronic device.

12. A protective apparatus for a mobile electronic device, the mobile electronic device having input and output ports and at least one electronic screen display, the protective apparatus comprising:
    a casing having internal dimensions adapted to tightly and removably attach around all peripheral sides of the mobile electronic device while also extending around an aperture that permits access to the at least one electronic screen display when the protective apparatus is assembled to the mobile electronic device;
    a housing defined by a sidewall disposed along a planar surface of a posterior wall of the casing, the planar surface disposed rearward of a rear surface of the mobile electronic device when the protective apparatus is assembled to the mobile electronic device;
    an extendable and retractable earpiece cable assembly that is received into the housing from an interior of the casing and including at least one earpiece cable and a mechanism around which the at least one earpiece cable is wound, the housing having an opening through which the at least one earpiece cable is extends;
    wherein when the protective apparatus is assembled to the mobile electronic device to be used and stored by the user, the casing is attached to the rear of the mobile electronic device and is tightly and removably attached around all peripheral sides of the mobile electronic device, and the casing, the housing and the extendable and retractable earpiece cable assembly form an integrated assembly with the at least one earpiece cable having a first end attached to an earpiece and a second end electrically connected to an output port of said mobile electronic device.

13. The protective apparatus of claim 12, wherein the housing is integrally formed with the casing.

14. The protective apparatus of claim 12, wherein the housing is removably attached to the casing.

15. The protective apparatus of claim 12, wherein the casing further comprises a pliable material.

16. The protective apparatus of claim 12, wherein the casing further comprises a rubber or plastic material.

17. The protective apparatus of claim 12, wherein the extendable and retractable earpiece cable assembly includes two earpiece cables.

18. The protective apparatus of claim 12, wherein the sidewall of the housing has a generally annular shape.

19. The protective apparatus of claim 12, wherein the casing has at least one opening that permits access to an output port of the mobile electronic device with the protective apparatus is assembled to the mobile electronic device.

* * * * *